(12) United States Patent
Sogabe

(10) Patent No.: US 11,257,193 B2
(45) Date of Patent: Feb. 22, 2022

(54) IMAGE PROCESSING APPARATUS

(71) Applicant: DENSO CORPORATION, Kariya (JP)

(72) Inventor: Haruhiko Sogabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 50 days.

(21) Appl. No.: 16/800,778

(22) Filed: Feb. 25, 2020

(65) Prior Publication Data

US 2020/0193571 A1 Jun. 18, 2020

Related U.S. Application Data

(63) Continuation of application No. PCT/JP2018/028254, filed on Jul. 27, 2018.

(30) Foreign Application Priority Data

Sep. 5, 2017 (JP) .............................. JP2017-170586

(51) Int. Cl.
| | |
|---|---|
| *G06T 5/00* | (2006.01) |
| *G06T 7/11* | (2017.01) |
| *H04N 19/105* | (2014.01) |
| *H04N 19/119* | (2014.01) |
| *H04N 19/164* | (2014.01) |
| *H04N 19/167* | (2014.01) |
| *H04N 19/174* | (2014.01) |

(Continued)

(52) U.S. Cl.
CPC ................ *G06T 5/003* (2013.01); *G06T 7/11* (2017.01); *H04N 19/105* (2014.11); *H04N 19/119* (2014.11); *H04N 19/164* (2014.11); *H04N 19/167* (2014.11); *H04N 19/174* (2014.11); *G06K 9/00791* (2013.01); *G06T 2207/30252* (2013.01); *G08G 1/13* (2013.01); *H04N 19/127* (2014.11)

(58) Field of Classification Search
CPC . G06T 5/003; G06T 7/11; G06T 2207/30252; H04N 19/127; H04N 19/105; H04N 19/119; H04N 19/164; H04N 19/167; H04N 19/174; H04N 7/18; G06K 9/00791; G08G 1/13; G08G 1/00; G07C 5/00
USPC ........................................................ 382/255
See application file for complete search history.

(56) References Cited

U.S. PATENT DOCUMENTS

| | | | | |
|---|---|---|---|---|
| 2010/0283589 | A1* | 11/2010 | Kawai | H04N 19/167 340/425.5 |
| 2011/0267452 | A1* | 11/2011 | Notsu | H04N 5/772 348/116 |
| 2012/0287996 | A1* | 11/2012 | Kadono | H04N 19/31 375/240.12 |

FOREIGN PATENT DOCUMENTS

| | | | | |
|---|---|---|---|---|
| JP | 2001045438 A | * | 2/2001 | ........... G07C 5/0891 |
| JP | 2002209173 A | | 7/2002 | |

(Continued)

OTHER PUBLICATIONS

U.S. Appl. No. 16/800,851, filed Feb. 25, 2010, Sogabe.

*Primary Examiner* — Nancy Bitar
*Assistant Examiner* — Daniella M. DiGuglielmo
(74) *Attorney, Agent, or Firm* — Harness, Dickey & Pierce, P.L.C.

(57) ABSTRACT

An image processing apparatus included in a vehicle comprises: a division section that is configured to divide into a plurality of areas, a captured image sequentially captured by an imaging device that captures images around the vehicle; an importance set section that is configured to set an importance level for each of the areas; and a compression section that is configured to compress the captured image for each of the areas.

14 Claims, 4 Drawing Sheets

(51) Int. Cl.
  *H04N 19/127* (2014.01)
  *G06K 9/00* (2006.01)
  *G08G 1/13* (2006.01)

(56) References Cited

FOREIGN PATENT DOCUMENTS

| | | | |
|---|---|---|---|
| JP | 2007172551 A | | 7/2007 |
| JP | 2009105741 A | * | 5/2009 |
| JP | 2010028189 A | | 2/2010 |
| JP | 2010191867 A | | 9/2010 |
| JP | 2010263500 A | | 11/2010 |
| JP | 2013041481 A | | 2/2013 |
| JP | 2014053831 A | * | 3/2014 |
| WO | WO-2009153922 A1 | * | 12/2009 ............. G07C 5/085 |
| WO | WO-2016151978 A1 | * | 9/2016 ............... H04N 7/18 |
| WO | WO-2019054070 A1 | | 3/2019 |

* cited by examiner

FIG. 5
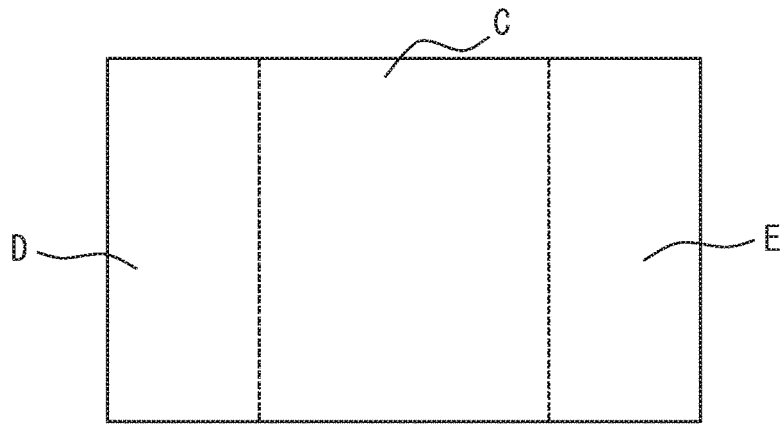
FIG. 6
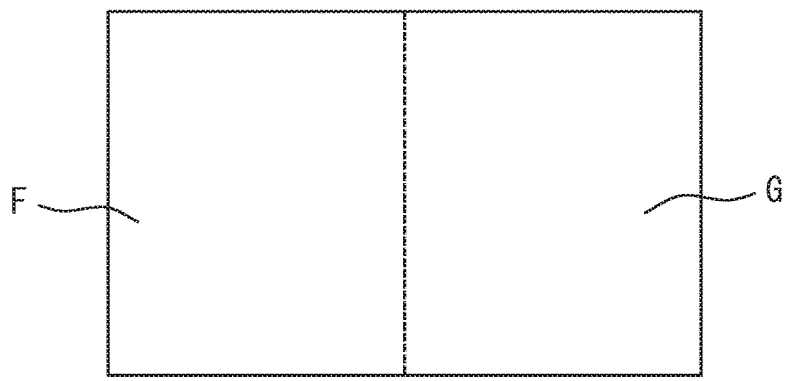
FIG. 7
|  | IMPORTANCE LEVEL "HIGH" | IMPORTANCE LEVEL "MEDIUM" | IMPORTANCE LEVEL "LOW" |
| --- | --- | --- | --- |
| BLOCK SIZE RANGE | SELECTABLE FROM 16 × 16 to 4 × 4 | SELECTABLE FROM 16 × 16, 8 × 8 | ONLY 16 × 16 SELECTABLE |
| MOTION COMPENSATION TARGET DIRECTION | ALL DIRECTIONS | ONLY LEFT-RIGHT DIRECTION | NONE |
| PREVIOUS FRAME REFERENCE RANGE | REFERENCE TO 10 FRAMES ALLOWED | REFERENCE TO 1 FRAME ALLOWED | NONE |

|  | IMPORTANCE LEVEL "HIGH" | IMPORTANCE LEVEL "LOW" |
|---|---|---|
| BLOCK SIZE RANGE | SELECTABLE FROM 16 × 16 to 4 × 4 | SELECTABLE FROM 16 × 16, 8 × 8 |
| MOTION COMPENSATION TARGET DIRECTION | ALL DIRECTIONS | ONLY LEFT-RIGHT DIRECTION |
| PREVIOUS FRAME REFERENCE RANGE | REFERENCE TO 10 FRAMES ALLOWED | REFERENCE TO 1 FRAME ALLOWED |

IMAGE PROCESSING APPARATUS

CROSS-REFERENCE OF RELATED APPLICATION

The present application is a continuation application of International Patent Application No. PCT/JP2018/028254 filed on Jul. 27, 2018 which designated the U. S. and claims the benefit of priority from Japanese Patent Application No. 2017-170586 filed on Sep. 5, 2017. The entire disclosures of all of the above applications are incorporated herein by reference.

TECHNICAL FIELD

The present disclosure relates to an image processing apparatus that compresses a captured image.

BACKGROUND

A technology for compressing a captured image has been known. For example, a drive recorder compresses and stores a captured image.

SUMMARY

The present disclosure describes an image processing apparatus that is configured to divide a captured image into a plurality of areas, set an importance level for each of the areas, and compress the captured image for each of the areas.

BRIEF DESCRIPTION OF DRAWINGS

Objects, features, and advantages of the present disclosure will become more apparent from the following detailed description with reference to the accompanying drawings. In the drawings:

FIG. 5 is a diagram for explaining an example of division of a captured image by the image area division section;

FIG. 6 is a diagram for explaining an example of division of a captured image by the image area division section;

FIG. 7 is a chart for explaining an example of a change of interframe prediction methods in accordance with an importance level;

DETAILED DESCRIPTION

Figure 1:
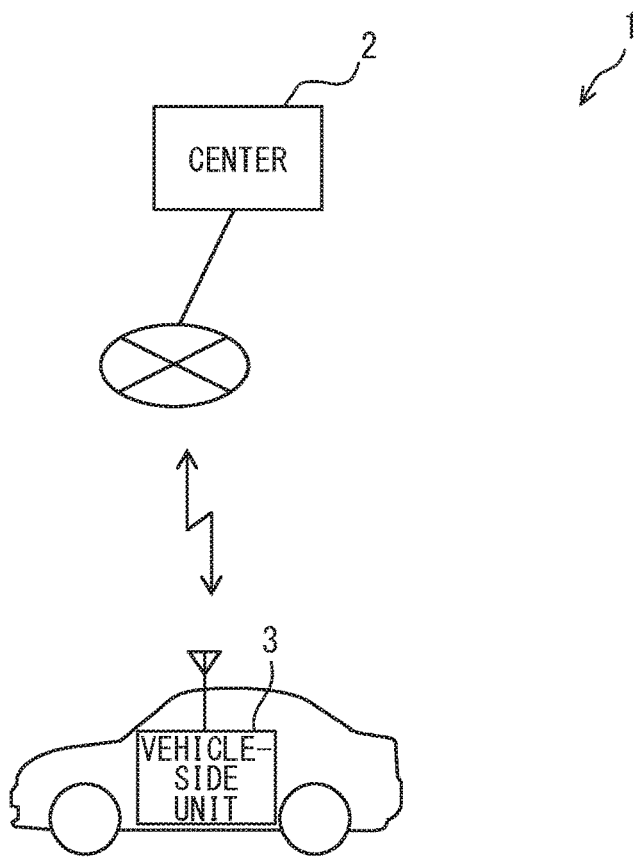
FIG. 1 is a diagram showing an example of a schematic configuration of a collection system.

Recently, improvement of both a frame rate and compression efficiency may be demanded even for a low-specification processor with an increasing need for accumulation and transmission of a captured image such as a monitoring image and a traveling image captured by a drive recorder.

The present disclosure describes an image processing apparatus capable of achieving improvement of both a frame rate and compression efficiency even for a low-specification processor.

According to one aspect of the present disclosure, an image processing apparatus may comprise: a division section that is configured to divide a captured image sequentially captured by an imaging device into a plurality of areas; an importance set section that is configured to set an importance level for each of the areas; and a compression section that is configured to compress the captured image for each of the areas. The compression portion may perform a compression process for the captured image, and the compression process may become simpler as the importance level set by the importance set section for the corresponding area lowers.

According to the configuration, the compression process for the captured image becomes simpler in the area at the lower importance level set by the importance set section in the captured images divided into multiple areas. Accordingly, a processing load can be more reduced as the importance level of the area lowers. In this case, the process can be allocated to the area at the higher importance level by reduction of the processing load. Accordingly, the frame rate for processing the captured image by the image processing apparatus can increase while improving the compression efficiency. In addition, the importance level is set for each of the areas, and the compression process becomes simpler as the importance level set for the corresponding area of the captured image lowers. In this case, the degree of simplification of compression can be more reduced for the area at the higher importance level in the captured image to secure necessary image quality. Accordingly, improvement of both the frame rate and the compression efficiency is achievable even for a low-specification processor.

Several embodiments for disclosure will be described with reference to the drawings. For convenience of description, the same reference numerals are assigned to parts having the same functions as those illustrated in the drawings used in the description so far among the multiple embodiments, and a description of the same portions may be omitted. The descriptions of other embodiments may be referred to with respect to these parts given the same reference numerals.

First Embodiment (Schematic Configuration of Collection System 1)

A first embodiment of the present disclosure will be hereinafter described with reference to the drawings. As shown in FIG. 1, a collection system 1 includes a center 2, and a vehicle-side unit 3 provided on a vehicle.

The center 2 is a server device, for example. The center 2 collects images captured by a camera 34 of the vehicle and transmitted from a communication terminal 30, which is described below, in the vehicle-side unit 3 provided on the vehicle. The center 2 may be constituted by either a single server device or multiple server devices.

The vehicle-side unit 3 is provided on the vehicle to sequentially capture an image around a subject vehicle. The vehicle-side unit 3 also performs encoding for compressing an image sequentially captured. The image sequentially captured may be referred to as a moving image. The vehicle-side unit 3 communicates with the center 2, and transmits the compressed captured image to the center 2. Details of the vehicle-side unit 3 will be described below.

(Schematic Configuration of Vehicle-Side Unit 3)

Figure 2:
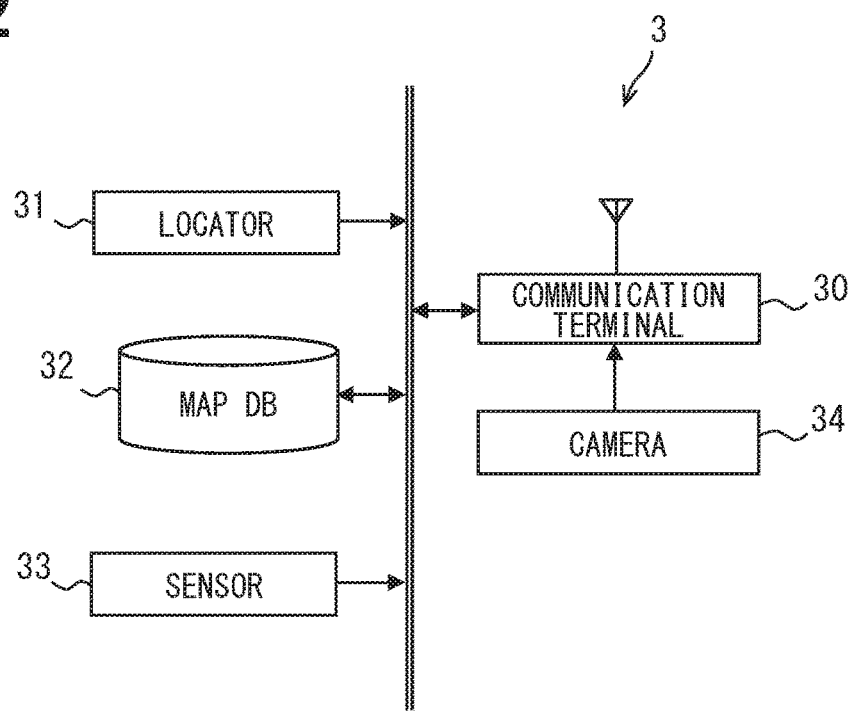
FIG. 2 is a diagram showing an example of a schematic configuration of a vehicle-side unit.

An example of a schematic configuration of the vehicle-side unit 3 will be next described with reference to FIG. 2. As shown in FIG. 2, the vehicle-side unit 3 includes the communication terminal 30, a locator 31, a map database (hereinafter referred to as DB) 32, a vehicle state sensor 33, and the camera 34. It is assumed that the communication terminal 30, the locator 31, the map DB 32, and the vehicle state sensor 33 are connected to an in-vehicle local area network (LAN), for example. While FIG. 2 shows a configuration which directly connects the camera 34 to the communication terminal 30, this configuration is not necessarily required to be adopted. For example, a configuration which indirectly connects the camera 34 via the in-vehicle LAN may be adopted.

The locator 31 includes a global navigation satellite system (GNSS) receiver and an inertial sensor. The GNSS receiver receives positioning signals from multiple artificial satellites. The inertial sensor includes a gyro sensor and an acceleration sensor, for example. The locator 31 sequentially measures a vehicle position of the subject vehicle on which the locator 31 is mounted by combining a positioning signal received by the GNSS receiver and a measurement result from the inertial sensor. For example, the vehicle position may be measured based on a traveling distance obtained from detection results sequentially output from a vehicle speed sensor mounted on the subject vehicle. The measured vehicle position is output to the in-vehicle LAN.

The map DB 32 is a non-volatile memory, and stores map data such as link data and node data. The map data may include a three-dimensional map constituted by a point group of feature points indicating road shapes and structures. When the three-dimensional map constituted by the point group of feature points indicating road shapes and structures is used as the map data, the locator 31 may be configured to identify the vehicle position of the subject vehicle not by using the GNSS receiver, but by using the three-dimensional map and detection results obtained by a peripheral monitoring sensor such as light detection and ranging or laser imaging detection and ranging (LIDAR) which detects the point group of the feature points indicating road shapes and structures.

The vehicle state sensor 33 is a sensor group for detecting various states of the subject vehicle, such as a traveling state and an operation state. Examples of the vehicle state sensor 33 include a vehicle speed sensor which detects a speed of the subject vehicle, a steering sensor which detects a steering angle of steering of the subject vehicle, and other states. The vehicle state sensor 33 outputs detected sensing information to the in-vehicle LAN. The sensing information detected by the vehicle state sensor 33 may be output to the in-vehicle LAN via an electric control unit (ECU) mounted on the subject vehicle.

The camera 34 is a camera provided on the subject vehicle to capture an image in a predetermined range around the subject vehicle. The camera 34 corresponds to an imaging device of the present disclosure. The camera 34 may be either a camera mounted on the subject vehicle, or a camera of a smart phone, for example. The camera of the smart phone or the like used as the camera 34 may be connected to the communication terminal 30 described below via short distance wireless communication, for example. Alternatively, the smart phone may function as both the camera 34 and the communication terminal 30 described below, and may be connected to the in-vehicle LAN via short distance wireless communication, for example.

An imaging direction of the camera 34 may be a direction rearward the subject vehicle, for example. However, according to the example described in the present embodiment, the imaging direction is a direction toward the front of 25 the subject vehicle. In addition, according to the example described in the present embodiment, each of images sequentially captured by the camera 34 is a full high definition (FullHD) image with a resolution of 1920×1080 dots, and a frame rate of 30 fps.

The communication terminal 30 communicates with the center 2 via a public communication network by mobile communication with a base station or transmission and reception of information to and from an access point of a wireless LAN through wireless communication, for example. The communication terminal 30 compresses an image sequentially captured by the camera 34, and transmits the compressed image to the center 2. Accordingly, the camera 34 and the communication terminal 30 perform a so-called drive recorder function. The communication terminal 30 corresponds to an image processing apparatus of the present disclosure. Details of the communication terminal 30 will be described below.

(Schematic Configuration of Communication Terminal 30)

A schematic configuration of the communication terminal 30 will be described. The communication terminal 30 includes a microcomputer which has a processor, a memory, an I/O, and a bus for connecting these components in addition to a wireless communication antenna. The microcomputer executes a control program stored in the memory to execute various processes. The memory referred to herein is a non-transitory tangible storage medium that stores computer-readable programs and data in a non-temporary manner. The non-transitory tangible storage medium is implemented by a semiconductor memory, a magnetic disk, or the like.

Figure 3:
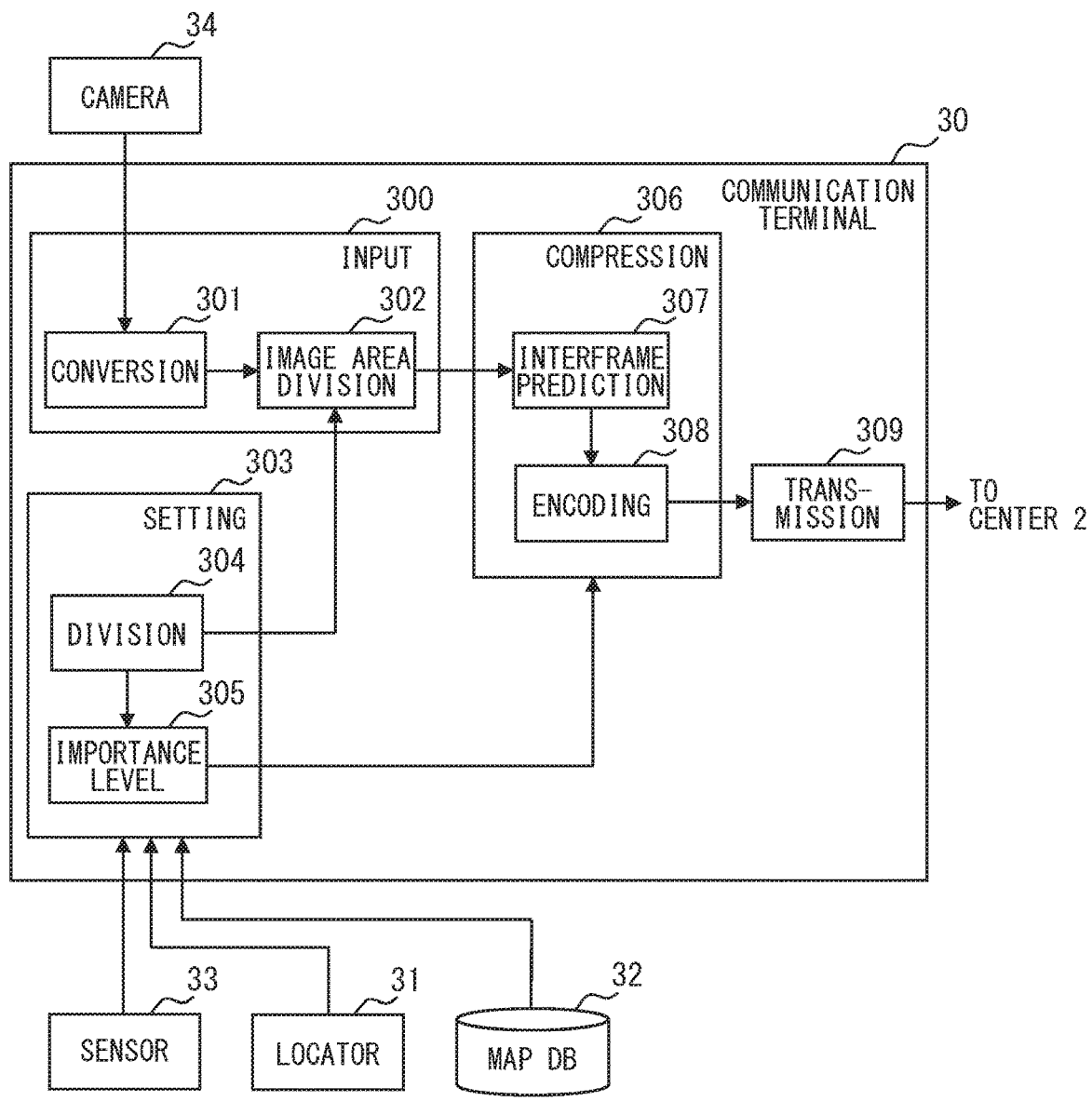
FIG. 3 is a diagram showing an example of a schematic configuration of a communication terminal.

As shown in FIG. 3, the communication terminal 30 includes an input section 300, a set section 303, a compression section 306, and a transmission section 309 as functional blocks. The input section 300 includes a conversion section 301 and an image area division section 302. The set section 303 includes a division set section 304 and an importance set section 305. The compression section 306 includes an interframe prediction section 307 and an encoding compression section 308.

The input section 300 receives input of a captured image sequentially captured by the camera 34. The conversion section 301 performs conversion for lowering a resolution and a frame rate of the captured image sequentially input from the camera 34. For example, an image captured by the camera 34 with a resolution of 1920×1080 dots FullHD and a frame rate of 30 fps is converted into an image with a resolution of 640×480 dots video graphics array (VGA) and a frame rate of 10 fps.

The input section 300 may be eliminated from the conversion section 301. In this case, the input section 300 does not perform conversion for lowering the resolution and the frame rate of the image sequentially captured by the camera 34. By the above-described conversion performed by the conversion section 301, a data volume of the captured image transmitted to the center 2 is allowed to fall within a level preferable for communication even when the data volume does not fall within the preferable level for communication only by the compression performed by the compression section 306 described below.

The image area division section 302 divides the captured image converted by the conversion section 301 into multiple areas in accordance with a setting determined by the division set section 304 of the set section 303. The captured image divided into the multiple areas is output to the compression section 306. The image area division section 302 corresponds to a division section of the present disclosure. The division set section 304 sets areas into which the captured image is divided by the image area division section 302. The areas produced by the division may be fixed areas, or may be set according to a traveling state and/or a traveling position, or the like of the subject vehicle.

Figure 4:
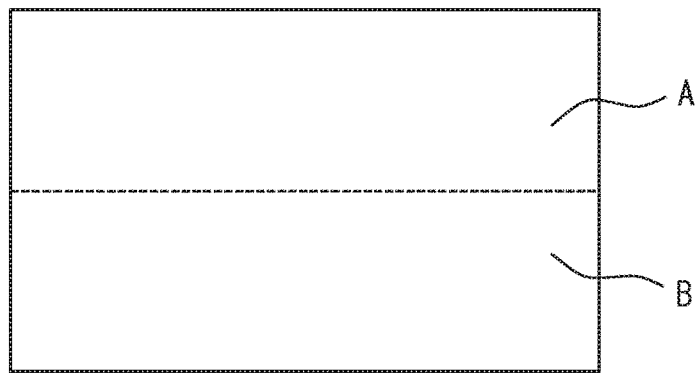
FIG. 4 is a diagram for explaining an example of division of a captured image by an image area division section.

For example, the configuration which fixes the areas produced by the division may be such a configuration which divides the captured image into multiple areas along the vertical direction as shown in FIG. 4. A part A of FIG. 4 shows an area on the zenith side, while a part B shows an area on the ground side. The division of the areas may be division into two parts as shown in FIG. 4, or division into more than two parts. The same applies to division into multiple areas described below. When the areas produced by the division are set in accordance with the traveling state and/or the traveling position, or the like of the subject vehicle, the areas may be determined in a following manner, for example.

During traveling of the subject vehicle, for example, the captured image may be divided into multiple areas along the vertical direction as shown in FIG. 4. At a stop of the subject vehicle, the captured image may be divided into multiple areas on a central side and a left-and-right side in the traveling route of the subject vehicle as shown in FIG. 5. Whether the subject vehicle is traveling or stopping may be determined from a vehicle speed detected by the vehicle speed sensor of the vehicle state sensors 33. A part C of FIG. 5 indicates a central area, a part D indicates a left area, and a part E indicates a right area. The left-and-right side may be referred to as left-and-right sides.

When the subject vehicle is steered by a certain amount or more, the captured image may be divided into multiple areas on the left-and-right side of the subject vehicle as shown in FIG. 6. A part F of FIG. 6 indicates a left area, while a part G indicates a right area. In this case, the captured image may be divided into multiple areas on the central side and the left-and-right side in the traveling route of the subject vehicle as shown in FIG. 5. An example of division into multiple areas on the central side and the left-and-right side in the traveling route of the subject vehicle will be hereinafter described by way of example. Steering of the subject vehicle by a certain amount or more may be determined from a steering angle detected by the steering angle sensor of the vehicle state sensor 33. The state of "a certain amount or more" herein may be a steering angle of equal to or larger than an angle at which a left or right turn is estimated. When the subject vehicle is started from a stop and steered by a certain amount or more, division of the captured image may be switched from division into multiple areas on the central side and the left-and-right side in the traveling route of the subject vehicle to division into multiple areas on the left-and-right side of the subject vehicle.

In addition, during traveling of the subject vehicle, the captured image may be divided into multiple areas on the central side and the left-and-right side in the traveling route of the subject vehicle as shown in FIG. 5. In this case, the captured image may also be divided into multiple areas along the vertical direction.

During traveling of the subject vehicle before an arrival at an intersection, the captured image may be divided into multiple areas along the vertical direction as shown in FIG. 4. At the arrival of the subject vehicle at the intersection, the captured image may be divided into multiple areas on the central side and the left-and-right side in the traveling route of the subject vehicle as shown in FIG. 5. When the subject vehicle is steered by a certain amount or more, the captured image may be divided into multiple areas at least on the left-and-right side of the subject vehicle. The arrival of the subject vehicle at the intersection may be determined from the vehicle position of the subject vehicle measured by the locator 31 and the map data stored in the map DB 32.

When the vehicle arrives at a specific position other than the intersection, such as a spot where an object to be noted may rush out from the left or right, the captured image may be divided into multiple areas on the central side and the left-and-right side in the traveling route of the subject vehicle as shown in FIG. 5. This specific position may be determined from the vehicle position of the subject vehicle measured by the locator 31, and the map data stored in the map DB 32.

The importance set section 305 sets an importance level for each of the areas divided and set by the image area division section 302. The importance level may be fixed, or set in accordance with the traveling state and/or the traveling position, or the like of the subject vehicle. The importance set section 305 may set a higher importance level to an area easily overlooked by a driver of the subject vehicle, or containing a target to be noted with a high possibility, for example. Alternatively, importance levels of all areas may be uniformly raised or lowered depending on situations. The importance level may be classified into multiple levels. According to the example described in the present embodiment, the importance level is classified into an importance level "high", an importance level "medium", and an importance level "low" in a descending order of importance.

The importance set section 305 may be configured to set a lower importance level to an area on the zenith side than an area on the ground side when the captured image is divided into multiple areas along the vertical direction, for example. For example, in the case where the captured image is divided into two areas along the vertical direction as shown in FIG. 4, the area on the zenith side is set to the importance level "low", while the area on the ground side is set to the importance level "high".

The importance set section 305 may be configured to raise importance levels of the areas on the left-and-right side when the captured image is divided into multiple areas on the central side and the left-and-right side in the traveling route of the subject vehicle at a predetermined time of an arrival at a specific position, such as a stop of the subject vehicle, and an arrival at an intersection or a spot from which an object to be noted rushes out from the left or right. For example, the importance level of the areas on the left-and-right side may be set higher than the importance level on the central side in the traveling route, or may be set higher than the importance levels set for the areas on the left-and-right side before the predetermined time described above.

For example, the importance levels of the areas on the left-and-right side may be set higher than the importance level of the area on the central side of the traveling route by setting the importance level "low" for the area on the central side of the traveling route, and setting the importance level "high" for the areas on the left-and-right side when the captured image is divided into three parts of the central side and the left-and-right side in the traveling route of the subject vehicle as shown in FIG. 5. For example, the importance level may be set higher than the importance levels set for the areas on the left-and-right side before the foregoing predetermined time by setting the importance level "low" for the areas on the left-and-right side before the foregoing predetermined time, and switching the importance level from "low" to "high" for the areas on the left-and-right side at the foregoing predetermined time when the captured image is divided into multiple areas at least on the central side and the left-and-right side in the traveling route of the subject vehicle during traveling of the subject vehicle.

When the captured image is divided into multiple areas at least on the left-and-right side of the subject vehicle in response to steering of the subject vehicle by a certain amount or more, the importance set section 305 may set a higher importance level for the area on the side opposite to the steering direction than on the side of the steering direction. According to this configuration, it is possible to raise the importance level of the area on the side easily overlooked during steering. For example, when the captured image is divided into three parts of the central side and the left-and-right side in the traveling route of the subject vehicle as shown in FIG. 5, the importance level "low" may be set for the areas on the central side and the right side of the traveling route, while the importance level "high" may be set for the area on the left side during steering to the right.

The importance set section 305 may be configured to uniformly raise the importance levels of the areas divided and set by the image area division section 302 in accordance with an increase in the vehicle speed of the subject vehicle. In a case where the importance set section 305 adopts the configuration which divides the captured image into multiple areas at least on the central side and the left-and-right side in the traveling route of the subject vehicle during traveling of the subject vehicle, the importance set section 305 may raise the importance levels of the areas on the left-and-right side in accordance with an increase in the vehicle speed of the subject vehicle. For example, the importance level on the central side of the traveling route may be fixed regardless of the vehicle speed, while the importance levels on the left-and-right side may be increased in accordance with an increase in the vehicle speed.

Alternatively, when a communication rate of the transmission section 309 which transmits the captured image compressed by the compression section 306 described below to the center 2 is lower than a threshold, the importance set section 305 may uniformly and temporarily lower importance levels each set for the corresponding area until the communication rate returns to the threshold or higher. According to this configuration, the importance levels each set for the corresponding area can be uniformly lowered when a communication delay exceeding an allowable range is estimated during transmission of the captured image compressed by the compression section 306 to the center 2. The communication rate can be also referred to as a data transfer rate. The threshold referred to herein may be set in accordance with a communication delay allowed during transmission of the captured image from the transmission section 309 to the center 2, and may be set to any allowable value.

The compression section 306 includes the interframe prediction section 307 and the encoding compression section 308, and performs image compression for the captured image sequentially output from the input section 300 and divided by the image area division section 302 such that a compression process becomes simpler as the importance level set to the corresponding area by the importance set section 305 lowers.

The interframe prediction section 307 performs interframe prediction of respective frames of the captured image sequentially output from the input section 300. The interframe prediction section 307 switches a method of interframe prediction to a simpler method as the importance level set for each of the captured images of the areas divided by the image area division section 302 becomes lower. The encoding compression section 308 performs image compression by encoding a difference between frames predicted by interframe prediction. In this manner, the encoding compression section 308 performs image compression for the captured image such that the compression process becomes simpler as the importance level of the corresponding area set by the importance set section 305 lowers.

An example of switching of the interframe prediction method in accordance with the importance level will be herein described with reference to FIG. 7. According to the example presented in the present embodiment, the importance level is classified into three levels of "high", "medium", and "low". As shown in FIG. 7, in the interframe prediction method, a block size range, a motion compensation target direction, and a previous frame reference range of interframe prediction performed in units of blocks within a frame are changed in accordance with the importance levels.

As for the block size range, block sizes of 16×16 to 4×4 can be selected for the importance level "high", block sizes of 16×16 and 8×8 block can be selected for the importance level "medium", and only 16×16 can be selected for the importance level "low". In this manner, the number of types of selectable block sizes are reduced as the importance level lowers. In addition, the smaller block size is not selectable for the lower importance level. For example, the block sizes of 16×16 to 4×4 may include seven types of 16×16, 16×8, 8×16, 8×8, 8×4, 4×8, and 4×4. As described above, the number of types of selectable block sizes decreases as the importance level lowers. Accordingly, a processing load imposed on the processor of the communication terminal 30 for selecting the block size decreases as the importance level lowers. Moreover, as described above, the selectable block size is reduced as the importance level lowers. In this case, fine prediction is less likely to be performed as the importance level lowers. Accordingly, a processing load imposed on the processor of the communication terminal 30 decreases.

When the importance level is "high", all the directions of up, down, left, and right are targets of motion compensation. When the importance level is "medium", only the left-and-right directions are targets of motion compensation. When the importance level is "low", motion compensation is not performed. In this case, the number of the directions as the targets of motion compensation is reduced as the importance level lowers. Accordingly, the load of the motion compensation process performed by the processor of the communication terminal 30 decreases as the importance level lowers.

When the importance level is "high", reference to 10 frames is allowed in the reference range of the previous frames. When the importance level is "medium", reference to one frame is allowed. When the importance level is "low", reference to the previous frames is not allowed. As described above, the reference range of the previous frames is narrowed as the importance level lowers. Accordingly, the load of the process for referring to the previous frames by the processor of the communication terminal 30 decreases as the importance level lowers.

The encoding compression section 308 performs encoding in accordance with a result of interframe prediction when the importance is "high" or "medium". However, the encoding compression section 308 does not execute the interframe prediction, but performs image compression with a difference between the frames set to zero when the importance level is "low". Accordingly, when the importance level is "low", the compression process is greatly simplified to reduce the processing load imposed on the processor of the communication terminal 30.

A mode performed such that the compression process for the captured image becomes simpler as the importance level of the area lowers is not limited to the above-described mode, but may be such a configuration which changes only a part of the block size range, the motion compensation target direction, and the reference range of the previous frames in accordance with the importance level.

As described above, the image compression is performed for the captured image such that the image compression process becomes simpler as the importance level of the area lowers. Accordingly, the process performed by the processor can be allocated to the compression process for the area at the higher importance level by simplification of the compression process. In this case, the speed of compression process for the area at the higher importance level increases. Accordingly, even a low-specification processor can increase the speed of the compression process for the entire captured image, thereby increasing the frame rate. The compression section 306 may be configured to further improve compression efficiency by performing intraframe prediction as well.

The transmission section 309 transmits the captured image compressed by the compression section 306 to the center 2. The transmission section 309 may be configured to sequentially transmit the captured image sequentially compressed by the compression section 306 to the center 2, or may be configured to transmit the captured images to the center 2 after a certain volume of the captured images are accumulated in the memory.

(Image Compression Associated Process by Communication Terminal 30)

Figures 8, 9:
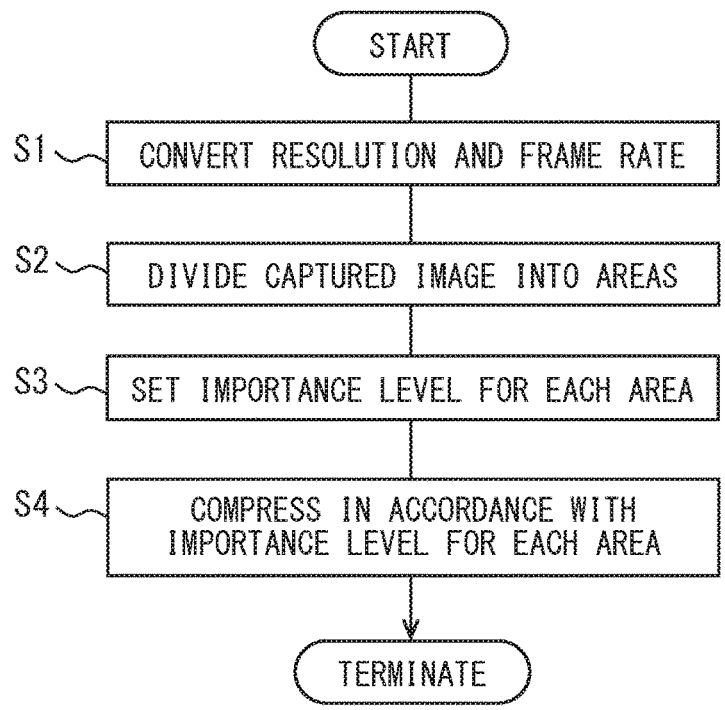
FIG. 8 is a flowchart showing an example of a flow of an image compression associated process performed by the communication terminal.
FIG. 9 is a chart for explaining an example of a change of interframe prediction methods in accordance with an importance level.

An example of a flow of a process associated with compression of a captured image (hereinafter referred to as image compression associated process) performed by the communication terminal 30 will be herein described with reference to a flowchart of FIG. 8. The flowchart of FIG. 8 may be started when an image captured by the camera 34 is input to the communication terminal 30, for example.

In S1, the conversion section 301 initially performs conversion for lowering a resolution and a frame rate of a captured image input from the camera 34. In S2, the image area division section 302 divides the captured image converted in S1 into multiple areas in accordance with a setting determined by the division set section 304.

In S3, the importance set section 305 sets an importance level for each of the areas divided and set by the image area division section 302. In S4, image compression is performed such that compression becomes simpler as the importance level set in S3 for each of the areas of the captured image divided in S2 lowers. Thereafter, the image compression associated process terminates.

For example, when the captured image is divided into multiple areas along the vertical direction and the importance level of the area on the zenith side is set to be lower than on the ground side, the image compression may be performed for the captured image such that the compression process becomes simpler for the area on the zenith side than on the ground side. In this case, the captured image in the area on the zenith side, where a change with an elapse of time is less likely to be produced, is less likely to be subjected to deterioration of image quality even when image compression is achieved by a simpler compression process. Accordingly, compression efficiency improves while reducing deterioration of image quality.

Moreover, the importance levels of the areas on the left-and-right side may be raised when the captured image is divided into multiple areas on the central side and the left-and-right side in the traveling route of the subject vehicle with higher importance levels set to the areas on the left-and-right side at a predetermined time of an arrival at a specific position, such as a stop of the subject vehicle, an arrival at an intersection, and a spot from which an object to be noted may rush out from the left or right, and image compression may be performed for the captured image such that the compression process becomes less simpler for the areas on the left-and-right side where the object to be noted is more likely to exist. This configuration can reduce deterioration of image quality of the captured image in the areas on the left-and-right side where the object to be noted is more likely to exist.

In addition, when the captured image is divided into multiple areas at least on the left-and-right side of the subject vehicle with the importance level of the area on the side opposite to the steering direction set higher than the importance level of the area on the side of the steering direction, image compression for the captured image may be performed such that the compression process becomes less simpler for the area on the side opposite to the steering direction than for the area on the side of the steering direction. This configuration can reduce deterioration of image quality of the captured image in the area on the side easily overlooked by the driver of the subject vehicle.

Furthermore, when the captured image is divided into multiple areas at least on the central side and the left-and-right side in the traveling route of the subject vehicle with the importance levels of the areas on the left-and-right side raised in accordance with an increase in the vehicle speed of the subject vehicle, image compression for the captured image is performed such that the compression process becomes less simpler for the areas on the left-and-right side. This configuration can reduce deterioration of image quality of the captured image in the areas on the left-and-right side more easily neglected as the vehicle speed of the subject vehicle increases.

In addition, when the importance levels each set for the corresponding area are temporarily and uniformly lowered until the communication rate of the transmission section 309 returns to the threshold or higher in a state that the communication rate is lower than the threshold, the compression process for the captured images in all the areas may be more simplified. According to this configuration, the compression efficiency of the image can be raised with a temporary drop of image quality to prevent a communication delay exceeding an allowable range when the communication delay exceeding the allowable range is likely to be produced at a lower communication rate of the transmission section 309 than the threshold.

According to the configuration of the first embodiment, the compression process for the captured image becomes simpler in the area at the lower importance level set by the importance set section 305 in the captured image divided into multiple areas. Accordingly, the processing load imposed on the processor of the communication terminal 30 can be more reduced as the importance level of the area lowers. In this case, the process can be allocated to the area at the higher importance level by reduction of the processing load. Accordingly, the frame rate for processing the captured image by the communication terminal 30 can increase while improving the compression efficiency. In addition, the importance level is set for each of the areas, and the compression process becomes simpler as the importance level set for the corresponding area of the captured image lowers. In this case, the degree of simplification of compression can be more reduced for the area at the higher importance level in the captured image to secure necessary image quality. Accordingly, improvement of both the frame rate and the compression efficiency is achievable even for a low-specification processor.

Second Embodiment

According to the first embodiment, image compression is performed with a difference between frames set to zero without performing interframe prediction for the captured image in the area at the lowest importance level set by the importance set section 305. However, this configuration is not necessarily required to be adopted. For example, interframe prediction may be performed even for the captured image in the area at the lowest importance level set by the importance set section 305, and interframe prediction may be more simplified for the captured image in the area at the lower importance level (hereinafter referred to as second embodiment).

An example which switches a method of interframe prediction in accordance with the importance level in the second embodiment will be described with reference to FIG. 9. In the example described in the second embodiment, the importance level is classified into two levels of "high" and "low". The interframe prediction method may be configured to change, in accordance with the importance level, at least a part of a block size range, a motion compensation target direction, and a previous frame reference range for interframe prediction performed in units of blocks within a frame, for example. However, according to the example described in the second embodiment, all of these factors are changed in accordance with the importance level as shown in FIG. 9.

As for the block size range, block sizes of 16×16 to 4×4 can be selected for the importance level "high", and block sizes of 16×16 and 8×8 can be selected for the importance level "low". When the importance level is "high", all the directions of up, down, left, and right are targets of motion compensation. When the importance level is "low", only the left-and-right directions are targets. When the importance level is "high", reference to 10 frames is allowed in the reference range of the previous frames. When the importance level is "low", reference to one frame is allowed. In this case, the encoding compression section 308 performs encoding in accordance with a result of interframe prediction in either case of the importance level of "high" or "low". Even in the configuration of the second embodiment, the compression process for the captured image is more simplified as the importance level of the area lowers. Accordingly, advantageous effects similar to those of the first embodiment can be offered.

Third Embodiment

The setting of division of the captured image determined by the division set section 304, and the setting of the importance level for each area determined by the importance set section 305 are not limited to the examples described in the first embodiment. The setting of division or the setting of the importance level may be determined in accordance with the direction or the region where an object to be noted is more likely to be located. For example, the setting of division of the captured image may be determined in such a manner as to separate a region where an object detected using an image recognition technology is located from the other regions to set a lower importance level for the areas corresponding to the other regions than the importance level of the area corresponding to the region where the object is located.

Fourth Embodiment

While the configuration which provides the communication terminal 30 on the vehicle has been described in the above embodiments, this configuration is not necessarily required to be adopted. The communication terminal 30 may be constituted by various moving bodies. In addition, the communication terminal 30 may be applied to a monitoring camera or the like fixed to an installation place, and an image captured by the monitoring camera may be transmitted to the center 2. In this case, for example, the setting of division of the captured image may be determined in such a manner as to separate a region where an object such as a human is located from the other regions to set a lower importance level for the areas corresponding to the other regions than the importance level of the area corresponding to the region where the object is located.

Fifth Embodiment

While the communication terminal 30 transmits the captured image captured by the camera 34 to the center 2 according to the embodiments described above, this configuration is not necessarily required to be adopted. For example, captured images captured by the camera 34 may be accumulated in a nonvolatile memory of a device which does not have the transmission section 309 of the communication terminal 30. Even in this configuration, a capacity required for the nonvolatile memory can be reduced by improving compression efficiency of the captured images. The nonvolatile memory may be built in the device, or may be a removable memory card.

It is noted that a flowchart or the processing of the flowchart in the present application includes multiple steps (also referred to as sections), each of which is represented, for instance, as S1. Further, each step can be divided into several sub-steps while several steps can be combined into a single step.

In the above, the embodiment, the configuration, an aspect of an image processing apparatus according to the present disclosure are exemplified. However, the present disclosure is not limited to every embodiment, every configuration and every aspect related to the present disclosure are exemplified. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. An image processing apparatus included in a vehicle, the apparatus comprising a processor and memory configured to:
   divide a captured image into a plurality of areas including areas corresponding to a central side and a left-and-right side of the vehicle in a traveling route of the vehicle, the captured image being sequentially captured by an imaging device that captures images around the vehicle;

set an importance level for each of the areas;
compress the captured image for each of the areas;
perform a compression process for the captured image, wherein the compression process becomes simpler as the importance level set for the corresponding area lowers; and
raise only the importance levels for the areas of the plurality of areas corresponding to the left-and-right side of the vehicle by classifying the areas corresponding to the left-and-right side of the vehicle into three or more levels as a speed of the vehicle increases.

2. The image processing apparatus according to claim 1, wherein the processor and memory are further configured to:
compress the captured image using interframe prediction;
compress, with a difference between a plurality of frames set to zero, the captured image in the area for which lowest importance level is set in importance levels settable by the processor and memory; and
compress the captured image in the area for which the importance level higher than the lowest importance level is set in the importance levels settable such that the interframe prediction becomes simpler as the importance level set for the corresponding area lowers.

3. The image processing apparatus according to claim 1, wherein the processor and memory are further configured to:
compress the captured image using interframe prediction such that the interframe prediction for the captured image becomes simpler as the importance level set by the processor and memory for the corresponding area lowers.

4. The image processing apparatus according to claim 1, wherein the processor and memory are further configured to:
divide the captured image into the plurality of areas at least along a vertical direction; and
set a lower importance level for an area on a zenith side of the areas than an area on a ground side.

5. The image processing apparatus according to claim 1, wherein the processor and memory are further configured to:
transmit a compressed captured image compressed by the processor and memory to a device outside the image processing apparatus; and
temporarily lower the importance level set for each of the areas until a communication rate of the processor and memory returns to a threshold or higher in response to the communication rate being lower than the threshold.

6. The image processing apparatus according to claim 1, wherein the processor and memory are further configured to:
perform interframe prediction, and compress the captured image based on the interframe prediction; and
change modes of interframe prediction in accordance with the importance level set for the corresponding area.

7. The image processing apparatus according to claim 6, wherein the processor and memory are further configured to:
change a range of a block size of the interframe prediction in accordance with the importance level.

8. The image processing apparatus according to claim 6, wherein the processor and memory are further configured to:
change a motion compensation target direction of the interframe prediction in accordance with the importance level.

9. The image processing apparatus according to claim 6, wherein the processor and memory are further configured to:
change a range of a previous frame reference of the interframe prediction in accordance with the importance level.

10. An image processing apparatus included in a vehicle, the apparatus comprising a processor and memory configured to:
divide a captured image into a plurality of areas including areas corresponding to a central side and a left-and-right side of the vehicle in a traveling route of the vehicle, the captured image being sequentially captured by an imaging device that captures images around the vehicle;
set an importance level for each of the areas;
compress the captured image for each of the areas;
perform a compression process for the captured image, the compression process becoming simpler as the importance level set for the corresponding area lowers;
change the importance level set for each of the areas in response to an arrival of the vehicle at a specific position; and
raise only the importance levels for the areas of the plurality of areas corresponding to the left-and-right side of the vehicle by classifying the areas corresponding to the left-and-right side of the vehicle into three or more levels as a speed of the vehicle increases.

11. The image processing apparatus according to claim 10, wherein:
the captured image is sequentially captured by the imaging device in front of the vehicle;
the processor and memory are further configured to raise the importance levels for the areas of the plurality of areas corresponding to the left-and-right side of the vehicle in response to an arrival of the vehicle at an intersection.

12. An image processing apparatus included in a vehicle, the apparatus comprising a processor and memory configured to:
divide a captured image into a plurality of areas, the captured image being sequentially captured by an imaging device that captures images around the vehicle;
set an importance level for each of the areas;
compress the captured image for each of the areas;
perform a compression process for the captured image, and the compression process becomes simpler as the importance level set for the corresponding area lowers;
divide the captured image captured by the imaging device in front of the vehicle into the plurality of areas including areas corresponding to at least a central side and a left-and-right side in a traveling route of the vehicle; and
raise only the importance levels for the areas of the plurality of areas corresponding to the left-and-right side of the vehicle by classifying the areas corresponding to the left-and-right side of the vehicle into three or more levels as a speed of the vehicle increases.

13. An image processing apparatus included in a vehicle, the apparatus comprising a processor and memory configured to:
divide a captured image into a plurality of areas, the captured image being sequentially captured by an imaging device that captures images around the vehicle;
set an importance level for each of the areas;
compress the captured image for each of the areas;
perform a compression process for the captured image, and the compression process becomes simpler as the importance level set for the corresponding area lowers;
divide the captured image captured by the imaging device in front of the vehicle into the plurality of areas including areas corresponding to at least a left-and-right direction of the vehicle;
set a higher importance level on a side opposite to a steering direction of the vehicle than on a side of the steering direction in the importance levels each set for the corresponding area; and
raise only the importance levels for the areas of the plurality of areas corresponding to the left-and-right side of the vehicle by classifying the areas corresponding to the left-and-right side of the vehicle into three or more levels as a speed of the vehicle increases.

14. An image processing apparatus included in a vehicle, the apparatus comprising a processor and memory configured to:
divide a captured image into a plurality of areas, the captured image being sequentially captured by an imaging device that captures images around the vehicle;
set an importance level for each of the areas; and
compress the captured image for each of the areas;
perform a compression process for the captured image, and the compression process becomes simpler as the importance level set for the corresponding area lowers;
divide the captured image captured by the imaging device in front of the vehicle into the plurality of areas including areas corresponding to at least a central side and a left-and-right side in the traveling route of the vehicle; and
raise the importance level on the left-and-right side of the vehicle in the importance levels each set for the corresponding area in response to a stop of the vehicle; and
raise only the importance levels for the areas of the plurality of areas corresponding to the left-and-right side of the vehicle by classifying the areas corresponding to the left-and-right side of the vehicle into three or more levels as a speed of the vehicle increases.

* * * * *